US006839876B1

(12) United States Patent
Tong et al.

(10) Patent No.: US 6,839,876 B1
(45) Date of Patent: Jan. 4, 2005

(54) PREAMBLE USING GOLAY SEQUENCE FOR ACCESS CHANNEL IN CELLULAR COMMUNICATIONS SYSTEMS

(75) Inventors: Wen Tong, Ottawa (CA); Bastien Massie, Paris (FR); Etienne Bouet, Courbevoie (FR); Evelyne Le Strat, Paris (FR)

(73) Assignee: Nortel Networks Limited, St. Laurent (CA)

( * ) Notice: Subject to any disclaimer, the term of this patent is extended or adjusted under 35 U.S.C. 154(b) by 1048 days.

(21) Appl. No.: 09/611,968

(22) Filed: Jul. 6, 2000

(51) Int. Cl.[7] .............................................. H03M 13/00
(52) U.S. Cl. ...................................... 714/783; 375/340
(58) Field of Search ................................. 370/320, 342, 370/481; 375/130, 343, 340; 600/443; 714/783

(56) References Cited

U.S. PATENT DOCUMENTS

| | | | | |
|---|---|---|---|---|
| 5,696,762 A | * | 12/1997 | Natali et al. ................. | 370/320 |
| 5,764,630 A | * | 6/1998 | Natali et al. ................. | 370/320 |
| 6,075,781 A | * | 6/2000 | Ohlson et al. ............... | 370/342 |
| 6,181,729 B1 | * | 1/2001 | O'Farrell ..................... | 375/130 |
| 6,301,268 B1 | * | 10/2001 | Laroia et al. ................ | 370/481 |
| 6,312,384 B1 | * | 11/2001 | Chiao .......................... | 600/443 |
| 6,567,482 B1 | * | 5/2003 | Popovic' ...................... | 375/343 |

OTHER PUBLICATIONS

S.Z. Budisin, "Efficient Pulse Compressor for Golay Complementary Sequences", Electronics Letters, Jan. 31, 1991, vol. 27, No. 3, pp. 219–220.

Ericsson, "New Rach Preambles with Low Auto–Correlation Sidelobes and Reduced Detector Complexity", TSG–RAN Working Group 1 Meeting #3, Nynashamn, Sweden, Mar. 22–26, 1999.

* cited by examiner

*Primary Examiner*—David Ton

(57) ABSTRACT

A preamble for a reverse access channel (RACH) of a CDMA (code division multiple access) communications system comprises a pair of constituent Golay sequences A and B concatenated with at least one pair, and preferably a plurality of different pairs, of transformed sequences which are also constituent Golay sequences, each pair of transformed sequences comprising a permutation of elements of the pair of sequences A and B. The permutations can include a reversed order of elements in the sequences, a reversed order of some or all of a set of address bits identifying locations of elements in the sequences, a concatenation of subsets of elements in odd and even locations of the sequences A and B, and combinations of these permutations. A method for providing the preamble, and related apparatus using a bidirectional counter and an address permutation unit, are described.

25 Claims, 2 Drawing Sheets

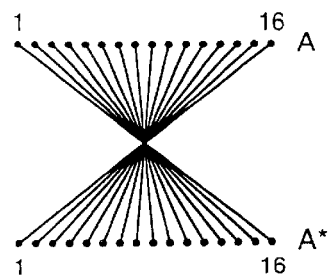
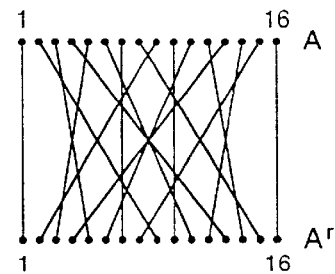
Fig. 1  Fig. 2
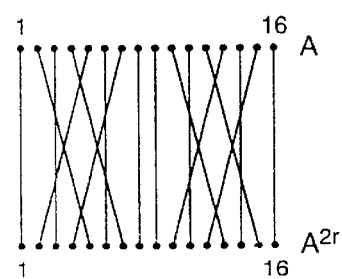
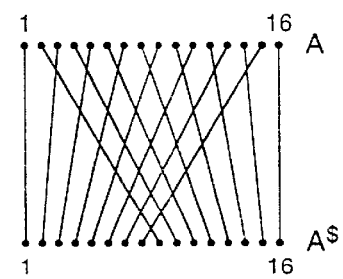
Fig. 3  Fig. 4
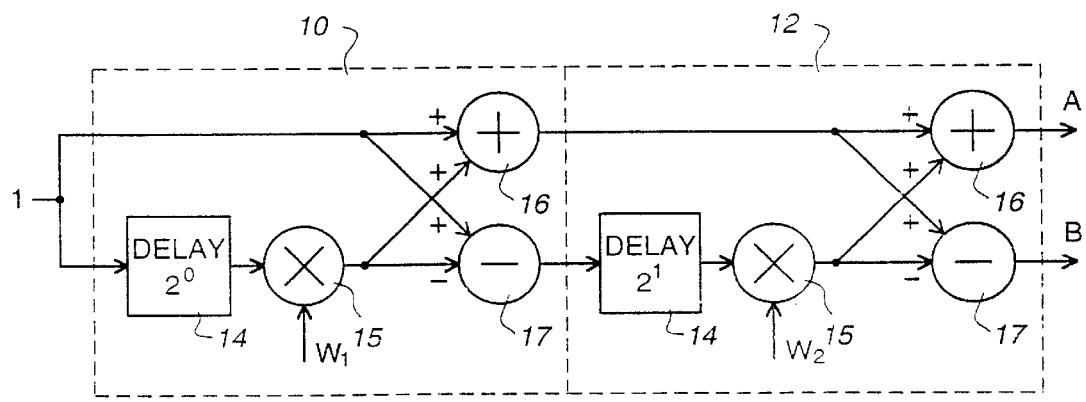
Fig. 5  PRIOR ART

PREAMBLE USING GOLAY SEQUENCE FOR ACCESS CHANNEL IN CELLULAR COMMUNICATIONS SYSTEMS

This invention relates to preambles using a Golay sequence for an access channel, in particular a so-called reverse access channel (RACH), in a cellular communications system.

BACKGROUND OF THE INVENTION

In cellular communications systems, for example in a wireless cellular communications system using CDMA (code division multiple access) techniques for communications between a mobile terminal or station (MS) and a base station (BS), it is well known for the BS to transmit a pilot signal and a broadcast message including a preamble. On being powered up in a cell associated with the BS, a MS uses the pilot signal for synchronization to the BS, and downloads information including the preamble from the broadcast message. Having accordingly determined the timing of the BS, the MS transmits the preamble on the RACH. This is detected by the BS using correlation techniques, so that the BS is informed of the MS, and it can proceed with establishing communications on a traffic channel between the BS and the MS.

In submission TSGR1#3(99)205 to the TSG-RAN Working Group 1 meeting #3, Mar. 22–26, 1999, entitled "New RACH preambles with low auto-correlation sidelines and reduced detector complexity", it is proposed that the preamble, which comprises 4096 code chips providing one of 16 orthogonal signatures of length 16 complex signals, be provided by binary Golay sequences, which have the advantageous property that the sum of their aperiodic auto-correlation functions is zero for all non-zero time shifts. Consequently, that submission purposes that the preamble be formed from a pair of complementary sequences A and B, which together constitute a Golay sequence and are referred to as constituent Golay sequences, each of 256 chips, repeated in a specific one of 16 signature patterns, so that the overall sequence has a length of 4096 chips, as shown by Table 1 below.

In Table 1, the signature patterns include the sequences A and B in normal and inverted forms, the inverted forms being denoted −A and −B respectively. The 4096 chips of an overall sequence can conveniently be included in one 10 ms time slot, the constituent Golay sequences A and B being individual to a specific cell and/or BS, and the above signature patterns being the same for all cells and base stations.

In contrast to using longer distinctive codes or sequences each of 4096 chips to identify the BS and any of 16 users, for which matched filtering would be required for sequences of 4096 chips, this preamble construction enables the matched filtering to be applied to the much shorter sequences of 256 chips, with a consequent substantial reduction in computational complexity.

It has been found, however, that Golay sequences (and Gold code sequences which have previously been proposed) produce substantial cross correlation peaks for time shifts corresponding to 256 chip boundaries, corresponding for example to a communication distance of about 9 km. Such undesired cross correlation peaks are understood to be due to the repetitive nature of the constituent sequences in the signature patterns discussed above, and present a significant challenge if the delay due to communications distance can correspond to the preamble length or a multiple of the preamble length, and hence for situations where it is desired to use a relatively short preamble and relatively large cell sizes.

Accordingly, aspects of this invention seek to provide an improved preamble, and method for providing such a preamble, for use in an access channel of a communications system, a method of producing an extended sequence from a pair of constituent Golay sequences, and related apparatus.

SUMMARY OF THE INVENTION

One aspect of this invention provides a method of producing an extended sequence from a pair of constituent Golay sequences A and B, comprising the steps of: transforming the pair of constituent Golay sequences A and B to form at least one pair of transformed sequences which are also constituent Golay sequences; and concatenating at least two of said pairs of constituent Golay sequences to produce the extended sequence.

The step of transforming the pair of constituent Golay sequences A and B to form each pair of transformed sequences preferably comprises a permutation of elements of the sequences. The permutation can comprise, for example, a reversal of the order of elements in the sequences, a reversal of a set of address bits identifying locations of elements in the sequences, a reversal of some but not all of a set of address bits identifying locations of elements in the sequences, or a concatenation of subsets of elements of the sequences selected by decimation, for example a concatenation of two subsets of elements, in even and odd locations in the sequences, or it can comprise combinations of these permutations.

TABLE 1

| | | | | | | | | | | | | | | | | |
|---|---|---|---|---|---|---|---|---|---|---|---|---|---|---|---|---|
| 1 | A | A | B | B | A | −A | −B | B | A | −A | B | −B | A | A | −B | −B |
| 2 | A | A | B | B | A | −A | −B | B | −A | A | −B | B | −A | −A | B | B |
| 3 | A | −A | B | −B | A | A | −B | −B | A | A | B | B | A | −A | −B | B |
| 4 | A | −A | B | −B | A | A | −B | −B | −A | −A | −B | −B | −A | A | B | −B |
| 5 | A | A | B | B | −A | A | B | −B | A | −A | B | −B | −A | −A | B | B |
| 6 | A | A | B | B | −A | A | B | −B | −A | A | −B | B | A | A | −B | −B |
| 7 | A | −A | B | −B | −A | −A | B | B | A | A | B | B | −A | A | B | −B |
| 8 | A | −A | B | −B | −A | −A | B | B | −A | −A | −B | −B | A | −A | −B | B |
| 9 | A | A | −B | −B | A | −A | B | −B | A | −A | −B | B | A | A | B | B |
| 10 | A | A | −B | −B | A | −A | B | −B | −A | A | B | −B | −A | −A | −B | −B |
| 11 | A | −A | −B | B | A | A | B | B | A | A | −B | −B | A | −A | B | −B |
| 12 | A | −A | −B | B | A | A | B | B | −A | −A | B | B | −A | A | −B | B |
| 13 | A | A | −B | −B | −A | A | −B | B | A | −A | −B | B | −A | −A | −B | −B |
| 14 | A | A | −B | −B | −A | A | −B | B | −A | A | B | −B | A | A | B | B |
| 15 | A | −A | −B | B | −A | −A | −B | −B | A | A | −B | −B | −A | A | −B | B |
| 16 | A | −A | −B | B | −A | −A | −B | −B | −A | −A | B | B | A | −A | B | −B |

The invention also provides a method of producing a preamble for use on an access channel of a cellular communications system, wherein the preamble includes an extended sequence produced by the above method. In particular, each of the constituent Golay sequences A and B and each of the transformed sequences can comprise 256 elements, and the preamble can comprise 4096 elements. Advantageously in this case the extended sequence can comprise the constituent Golay sequences A and B and seven different transformations of these sequences A and B.

Another aspect of this invention provides a method of providing a preamble for an access channel of a CDMA (code division multiple access) communications system, comprising the steps of: providing a pair of constituent Golay sequences A and B; permuting elements of the pair of sequences A and B to form at least one pair of transformed sequences which are also constituent Golay sequences; and concatenating said at least one pair of transformed sequences with the pair of constituent Golay sequences A and B for use as an extended sequence in the preamble.

The preamble can be provided by a concatenation of the pair of constituent Golay sequences A and B with a plurality of pairs of said transformed sequences according to different permutations of the elements of the pair of constituent Golay sequences A and B. The step of permuting elements of the pair of sequences A and B can comprise a reversal of the order of elements in the sequences, a reversal of at least some of a set of address bits identifying locations of elements in the sequences, or a concatenation of two subsets of elements of the sequences, the two subsets corresponding respectively to even and odd locations in the sequences.

The invention further provides apparatus for use in carrying out the above methods, comprising a memory for storing elements of each sequence, and address control means for addressing the memory for writing to or reading from the memory consecutively at locations according to the transformed sequences. The address control means can comprise a bidirectional counter for supplying memory addresses incremented in either of two opposite directions, and an address permutation unit for permuting said addresses in accordance with the transformed sequences and for supplying the permuted addresses to the memory.

Yet another aspect of the invention provides a preamble for an access channel of a CDMA (code division multiple access) communications system, comprising a pair of constituent Golay sequences A and B and, concatenated with the pair of constituent Golay sequences A and B, at least one pair of transformed sequences which are also constituent Golay sequences, each pair of transformed sequences comprising a permutation of elements of the pair of sequences A and B.

The preamble can comprise a plurality of pairs of said transformed sequences having different respective permutations of the elements of the pair of sequences A and B. In particular, respective pairs of transformed sequences can comprise the pair of sequences A and B with a reversed order of elements in the sequences, the pair of sequences A and B with elements in the sequences permuted in accordance with a reversed order of at least some of a set of address bits identifying locations of elements in the sequences, and elements in odd locations of the pair of sequences A and B concatenated with elements in even locations in the pair of sequences A and B.

BRIEF DESCRIPTION OF THE DRAWINGS

The invention will be further understood from the following description with reference to the accompanying drawings, in which:

FIGS. 1 to 4 are diagrams illustrating various transformations any of which may be carried out in implementations of the invention;

FIG. 5 schematically illustrates in a block diagram stages of a Golay sequence generator known in the art;

DETAILED DESCRIPTION

Figure 6:
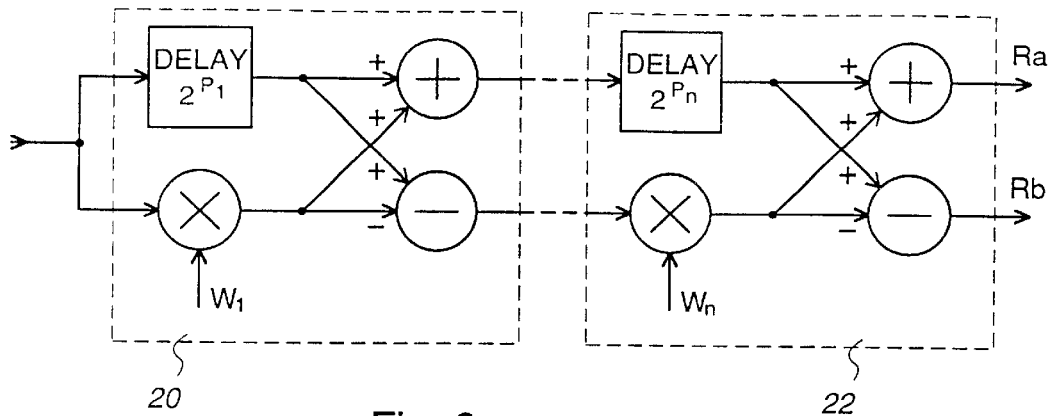
FIG. 6 schematically illustrates in a block diagram stages of a Golay sequence correlator known in the art.

Embodiments of this invention serve to perform various transforms, alone or in combinations, of the constituent Golay sequences that are used to provide a concatenated preamble and signature, in a manner that can eliminate or substantially reduce the undesired cross correlation peaks discussed above. Some of these transforms are referred to as sequence reversal, address bit reversal, partial bit reversal, and resampling or even odd partitioning, and are discussed in further detail below. The invention is also applicable to other transforms, and combinations of these and other transforms, that provide similar results and that may occur to those of ordinary skill in the art and/or are discussed later below. In each case the transform is applied to the two constituent Golay sequences A and B to result in another two sequences which, it can be shown, are also Golay sequences.

Sequence Reversal

This transform reverses the order of all of the elements of the constituent Golay sequences A and B to produce new constituent Golay sequences A* and B* respectively. Thus if the sequences A and B are given by:

$$A=[a_1, a_2, \ldots a_{N-1}, a_N]; B=[b_1, b_2, \ldots b_{N-1}, b_N]$$

then the sequences A* and B* are given by:

$$A^*=[a_N, a_{N-1}, \ldots a_2, a_1]; B^*=[b_N, b_{N-1}, \ldots b_2, b_1]$$

The preamble and signature can then be formed from both the two constituent Golay sequences A and B and the two reversed sequences A* and B*, in each case with N=256 chips, as shown by the following Table 2, representing the 16 signature patterns with the normal and inverted (−) forms of the sequences:

TABLE 2

| | | | | | | | | | | | | | | | | |
|---|---|---|---|---|---|---|---|---|---|---|---|---|---|---|---|---|
| 1 | A | B | A* | B* | A | −B | −A* | B* | A | −B | A* | −B* | A | B | −A* | −B* |
| 2 | A | B | A* | B* | A | −B | −A* | B* | −A | B | −A* | B* | −A | −B | A* | B* |
| 3 | A | −B | A* | −B* | A | B | −A* | −B* | A | B | A* | B* | A | −B | −A* | B* |
| 4 | A | −B | A* | −B* | A | B | −A* | −B* | −A | −B | −A* | −B* | −A | B | A* | −B* |
| 5 | A | B | A* | B* | −A | B | A* | −B* | A | −B | A* | −B* | −A | −B | A* | B* |
| 6 | A | B | A* | B* | −A | B | A* | −B* | −A | B | −A* | B* | A | B | −A* | −B* |
| 7 | A | −B | A* | −B* | −A | −B | A* | B* | A | B | A* | B* | −A | B | A* | −B* |

TABLE 2-continued

| 8  | A | -B | A*  | -B* | -A | -B | A*  | B*  | -A | -B | -A* | -B* | A  | -B | -A* | B*  |
|----|---|----|-----|-----|----|----|-----|-----|----|----|-----|-----|----|----|-----|-----|
| 9  | A | B  | -A* | -B* | A  | -B | A*  | -B* | A  | -B | -A* | B*  | A  | B  | A*  | B*  |
| 10 | A | B  | -A* | -B* | A  | -B | A*  | -B* | -A | B  | A*  | -B* | -A | -B | -A* | -B* |
| 11 | A | -B | -A* | B*  | A  | B  | A*  | B*  | A  | B  | -A* | -B* | A  | -B | A*  | -B* |
| 12 | A | -B | -A* | B*  | A  | B  | A*  | B*  | -A | -B | A*  | B*  | -A | B  | -A* | B*  |
| 13 | A | B  | -A* | -B* | -A | B  | -A* | B*  | A  | -B | -A* | B*  | -A | -B | -A* | -B* |
| 14 | A | B  | -A* | -B* | -A | B  | -A* | B*  | -A | B  | A*  | -B* | A  | B  | A*  | B*  |
| 15 | A | -B | -A* | B*  | -A | -B | -A* | -B* | A  | B  | -A* | -B* | -A | B  | -A* | B*  |
| 16 | A | -B | -A* | B*  | -A | -B | -A* | -B* | -A | -B | A*  | B*  | A  | -B | A*  | -B* |

FIG. 1 diagrammatically illustrates this transform for a simple case of 16 elements (N=16) in a sequence A represented by dots at the top of the illustration, these being reordered as shown by lines into a sequence A* represented by dots at the bottom of the illustration.

Address Bit Reversal

This transform reverses address bits, represented as binary numbers from 0 to N−1, which can be used to identify the elements of each of the sequences A and B, to produce new constituent Golay sequences Ar and Br respectively. Thus for example for N=256, the elements $a_1$, $a_2$, $a_3$, ..., $a_{254}$, $a_{255}$, $a_{256}$ of the constituent sequence A can be identified by the binary numbers 00000000, 00000001, 00000010, ..., 11111101, 11111110, 11111111 respectively, which are reversed to give the binary numbers 00000000, 10000000, 01000000, ..., 10111111, 01111111, 11111111 respectively, corresponding to the elements $a_1$, $a_{129}$, $a_{65}$, ..., $a_{192}$, $a_{128}$, $a_{256}$ respectively forming the transformed sequence $A^r$. The sequence B is transformed to the sequence $B^r$ in the same manner. This is in effect a random permutation of the positions of the constituent Golay sequences A and B, so that the transformed sequences $A^r$ and $B^r$ are also Golay sequences.

In the same manner as described above in relation to sequence reversal and Table 2, the preamble and signature can be formed from the constituent Golay sequences A and B and the transformed sequences $A^r$ and $B^r$, the latter transformed sequences substituting for the transformed sequences A* and B* in Table 2.

FIG. 2 diagrammatically illustrates this transform for a simple case of 16 elements (N=16). As in the case of FIG. 1, the sequence A is represented by dots at the top of the drawing, and these are reordered as shown by lines into the sequence $A^r$ represented by dots at the bottom of the drawing.

Partial Bit Reversal

This transform is similar to the address bit reversal described above, but reverses only a subset of the address bits, again represented as binary numbers, without making any change in the positions of the other address bits. For example, the most significant one of the address bits may be unchanged for each element of each sequence, with the other binary address bits being reversed in the manner described above, with the result that the transform reorders the elements of the sequence A in two distinct groups to form a transformed sequence $A^{2r}$. The elements of the sequence B are reordered in the same way to produce a transformed sequence $B^{2r}$. $A^{2r}$ and $B^{2r}$ are again constituent Golay sequences which can be used in place of the sequences A* and B* or $A^r$ and $B^r$ as described above. Other partitions between the unchanged and changed address bits can alternatively be made.

FIG. 3 diagrammatically illustrates this transform for a simple case of 16 elements (N=16). As in FIGS. 1 and 2, the sequence A is represented by dots at the top of the illustration, and these are reordered as shown by lines into the sequence $A^{2r}$ represented by dots at the bottom of the illustration, the reordering in this case being in two groups in that the most significant bit for each element address is not changed, and the remaining 3 bits for each element address are reversed.

Resampling or Even-Odd Partitioning

This transform concatenates two (or more) sub-sequences sequences of the elements of each of the sequences A and B obtained by decimation sampling to produce transformed sequences $A^\$$ and $B^\$$ respectively. The transformed sequences $A^\$$ and $B^\$$ are again constituent Golay sequences which can be used in place of the other transformed sequences as described above. For example, dividing the sequence A into two (even and odd) sub-sequences, its elements $a_1$, to $a_N$ are reordered as:

$$A^\$ = [a_1, a_3, \ldots a_{N-1}, a_2, a_4, \ldots a_N]$$

and the sequence B is similarly reordered to produce the sequence $B^\$$.

FIG. 4 diagrammatically illustrates this transform for a simple case of 16 elements (N=16). As in FIGS. 1 to 3, the sequence A is represented by dots at the top of the illustration, and these are reordered as shown by lines into the sequence $A^\$$ represented by dots at the bottom of the illustration.

The above are examples of transforms that can be used to permute the elements of the constituent Golay sequences A and B to form new constituent Golay sequences, and it can be appreciated that numerous other transforms can similarly be used. In addition, various combinations of these transforms can be used. For example, the elements of two of such transforms, or of one of such transforms and of the original constituent Golay sequences A and B, can be combined in an exclusive-or (XOR) logic operation to result in further constituent Golay sequences $A^x$ and $B^x$. For example:

$$A^x = A \otimes A^r = [a_1 \otimes a_{r1}, a_2 \otimes a_{r2}, \ldots a_N \otimes a_{rN}]$$

and similarly for the sequence BX.

It can be appreciated that although Table 2, and its equivalents using other transformed constituent sequences as described above, provides a reduced repetition of sequences within the overall sequence of 16×256=4096 chips, this repetition can be further reduced by use of different combinations of the transform sequences described above in a hybrid concatenated manner. By way of example, instead of the cycle A, B, A*, B* which is repeated four times as shown in Table 2 for each of the 16 signatures (determined by the absence and presence of—signs), a cycle of 16 original, transformed, and repeatedly transformed sequences can be used to provide an effective sequence of 4096 chips.

An example of this is given by the following Table 3:

TABLE 3

| A | B | C | D | E | F | G | H | A1 | B1 | C1 | D1 | E1 | F1 | G1 | H1 |
|---|---|---|---|---|---|---|---|---|---|---|---|---|---|---|---|
| A | B | A* | B* | A$^r$ | B$^r$ | A*$^r$ | B*$^r$ | A$^\$$ | B$^\$$ | A*$^\$$ | B*$^\$$ | A$^{2r}$ | B$^{2r}$ | A*$^{2r}$ | B*$^{2r}$ |

In Table 3, A to H and A1 to H1 represent respective ones of 16 constituent sequences produced as indicated by the second line of the table. For example, the sequence H is constituted by the sequence B after sequence reversal to produce the sequence B* as described above, this then being subject to transformation by address bit reversal as described above to produce a sequence B*$^r$. It can be appreciated that the concatenation alternates first the A and B constituent sequences and their respective transforms and then the sequence reversed transformations. Table 3 does not indicate the absence and presence of—signs representing the 16 signatures. Using for simplicity the nomenclature A to H and A1 to H1 of Table 3, the following Table 4 illustrates a possible allocation of 16 Hadamard-Walsh signatures which are arranged to facilitate operation in a high Doppler frequency environment:

for sequences of length N=256 as described above, there are 8 stages of the Golay sequence generator.

The generator stages 10 and 12 all have the same arrangement of a delay unit 14 having an input coupled to one input of the generator stage, a multiplier 15 for multiplying the output of the delay unit 14 by a coefficient W, and cross-coupled adding and subtracting units 16 and 17 for providing respectively the sum and the difference of the other input of the stage and the output of the multiplier 15 to constitute the outputs of the generator stage. The generator stages differ from one another in the delays provided by the delay units 14, these delays being powers of 2 from $2^0$ to $2^{P-1}$ and being arranged in any order among the stages, and the weights W which in FIG. 5 are indicated as $W_1$ and $W_2$ for the generator stages 10 and 12 respectively. For binary Golay sequences the weights W are binary weights of value ±1.

TABLE 4

| 1 | A | B | C | D | E | F | G | H | A1 | B1 | C1 | D1 | E1 | F1 | G1 | H1 |
|---|---|---|---|---|---|---|---|---|---|---|---|---|---|---|---|---|
| 2 | A | -B | C | -D | E | -F | G | -H | A1 | -B1 | C1 | -D1 | E1 | -F1 | G1 | -H1 |
| 3 | A | B | -C | -D | E | F | -G | -H | A1 | B1 | -C1 | -D1 | E1 | F1 | -G1 | -H1 |
| 4 | A | -B | -C | D | E | -F | -G | H | A1 | -B1 | -C1 | D1 | E1 | -F1 | -G1 | H1 |
| 5 | A | B | C | D | -E | -F | -G | -H | A1 | B1 | C1 | D1 | -E1 | -F1 | -G1 | -H1 |
| 6 | A | -B | C | -D | -E | F | -G | H | A1 | -B1 | C1 | -D1 | -E1 | F1 | -G1 | H1 |
| 7 | A | B | -C | -D | -E | -F | G | H | A1 | B1 | -C1 | -D1 | -E1 | -F1 | G1 | H1 |
| 8 | A | -B | -C | D | -E | F | G | -H | A1 | -B1 | -C1 | D1 | -E1 | F1 | G1 | -H1 |
| 9 | A | B | C | D | E | F | G | H | -A1 | -B1 | -C1 | -D1 | -E1 | -F1 | -G1 | -H1 |
| 10 | A | -B | C | -D | E | -F | G | -H | -A1 | B1 | -C1 | D1 | -E1 | F1 | -G1 | H1 |
| 11 | A | B | -C | -D | E | F | -G | -H | -A1 | -B1 | C1 | D1 | -E1 | -F1 | G1 | H1 |
| 12 | A | -B | -C | D | E | -F | -G | H | -A1 | B1 | C1 | -D1 | -E1 | F1 | G1 | -H1 |
| 13 | A | B | C | D | -E | -F | -G | -H | -A1 | -B1 | -C1 | -D1 | E1 | F1 | G1 | H1 |
| 14 | A | -B | C | -D | -E | F | -G | H | -A1 | B1 | -C1 | D1 | E1 | -F1 | G1 | -H1 |
| 15 | A | B | -C | -D | -E | -F | G | H | -A1 | -B1 | C1 | D1 | E1 | F1 | -G1 | -H1 |
| 16 | A | -B | -C | D | -E | F | G | -H | -A1 | B1 | C1 | -D1 | E1 | -F1 | -G1 | H1 |

Instead of using transformations of a single pair of constituent Golay sequences A and B as described above to produce longer effective Golay sequences, this can also be done by using another pair of constituent Golay sequences C and D which are not derivable by transformation from the pair A and B. Thus for example a cycle of four constituent sequences A, B, C, and D can be repeated four times to produce the 16×256=4096 chips overall sequence length, with the 16 signatures being provided as described above by selective inversion of the individual ones of the constituent sequences. In addition, the transformation techniques described above can be applied to the sequences C and D as well as to the sequences A and B.

However, this use of additional sequences C and D results in increased computational complexity and does not appear to produce improved correlation results.

FIG. 5 illustrates two stages 10 and 12 of a known Golay sequence generator which can be used to generate the constituent Golay sequences A and B. Each stage 10 or 12, shown within a dashed line box, has two inputs and two outputs, and the stages are concatenated with the two inputs of the first stage supplied with a binary 1 and the two outputs of the last stage providing the sequences A and B. Although only two stages are shown in FIG. 5, in fact the generator has P=$\log_2$N stages for providing sequences of length N. Thus It is observed that the choices of the weights W and the order of the delay stages of the generator can be selected to provide optimum properties for the resulting constituent Golay sequences A and B.

FIG. 6 illustrates two stages 20 and 22 of a known Golay sequence correlator which is referred to as an efficient Golay correlator or EGC. As in the case of the generator of FIG. 5, the EGC of FIG. 6 has n stages where n=$\log_2$N and N is the sequence length, with each stage having two inputs and two outputs, the stages being concatenated with an input sequence supplied to both inputs of the first stage and correlation outputs Ra and Rb produced at the outputs of the last stage. Each correlator stage includes a delay unit providing a delay from $2^0$ to $2^{n-1}$, a multiplier with a respective weight W of ±1, and cross-coupled adding and subtracting units, in an arrangement which is similar to that of the Golay sequence generator except that the delay unit is provided in the other input path.

The use of the EGC of FIG. 6 for the RACH of a cellular communications system is known for example from submission TSGR1#3(99)205 referred to above. In addition, reference is directed to S. Z. Budisin, "Efficient pulse compressor for Golay complementary sequences", Electronics Letters, Vol. 27, No. 3, pp. 219–220, January 1991. As these aspects are known in the art, they are not further described here.

Figure 7:
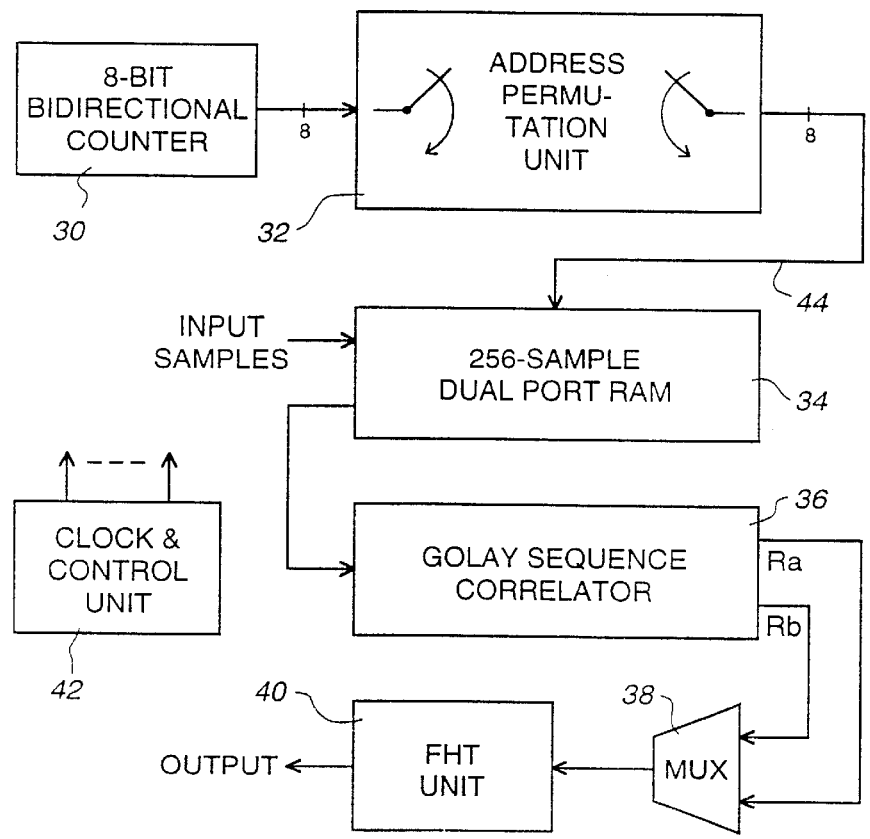
FIG. 7 schematically illustrates in a block diagram a preamble correlator and signature detector according to an embodiment of the invention.

FIG. 7 illustrates a block diagram of a preamble correlator and signature detector according to an embodiment of the invention. Such an arrangement is provided for example in a BS receiver of a cellular communications system, and it can be appreciated that a complementary arrangement, with similar address permutation to perform the transforms as described above, is provided for producing the concatenated preamble and signature.

For constituent sequences of length N=256, the detector of FIG. 7 comprises an 8-bit bidirectional counter 30, an address permutation unit 32, a 256-sample dual port RAM 34, a Golay sequence correlator 36, a multiplexer 38, a Fast Hadamard Transform (FHT) unit 40, and a clock and control unit 42 which supplies clock and control signals to the other units via clock and control lines which are not shown. Input samples are supplied to an input of the RAM 34 and are stored therein, at addresses provided by the unit 32 via an 8-bit address bus 44 as further described below, in sets of 256 samples corresponding to the Golay sequence length. The samples are read out consecutively from the RAM 34 to the correlator 36, which has the known EGC form indicated above with reference to FIG. 6. The correlator outputs Ra and Rb are supplied via the multiplexer 38 to the FHT unit 38, which serves in known manner to provided a final detector output for example in accordance with the signatures of Table 4 above.

These signatures are of length 16, so that over the duration of the preamble of 4096 chips 16 sets of 256-chip samples are processed in the units 36, 38, and 40 in a substantially known manner. The units 30 and 32, operating under the control of the clock and control unit 42, provide a corresponding synchronized cycle of 16 address permutations for these sets, in accordance with the transforms described above and for example in the manner represented in Tables 3 and 4.

To this end, the address permutation unit 32 is arranged to provide a cyclic selection from among different sets of connections between its inputs and its outputs, as is represented diagrammatically in FIG. 7 by selector switches at the (8-bit wide) input and output of the unit 32. Within the unit 32, these connections can be in the form of direct connections between the inputs and outputs corresponding to the illustrations of FIGS. 1 to 4 and their variants as described above, for example as given by Table 3. The sequence reversal transforms (indicated by the * in Table 3) are conveniently effected by reversing the count direction of the counter 30, so that samples are stored in the RAM 34 at a reversed sequence of addresses from that from which they are read out to the correlator. For the other transforms (e.g. $A^r$, $A^\$$, and $A^{2r}$ in relation to the sequence A) represented in Table 3, respective sets of direct connections are selected cyclically by the unit 32 in accordance with FIGS. 2, 4, and 3 respectively, in comparison to straight-through (i.e. not permuted) connections for the sequence A.

Accordingly, the various transforms represented in Table 3, or other transforms that may be used, can be easily provided by an arrangement such as that of the bidirectional counter 30 and address permutation unit 32.

It can be appreciated that although FIG. 7 and the above description relate to permuted storage in, and consecutive read-out from, the RAM to provide decoding of the transformations described above, these operations could be interchanged with equivalent effect. In addition, it can be appreciated that substantially the same operations can be provided in substantially equivalent manner for effecting the transformations in generating the transformed sequences. Thus for example the correlator 36 of FIG. 7 could be replaced by a Golay sequence generator, having the form of FIG. 5, whose output is supplied to the RAM, an output of the RAM providing the generated and transformed sequences, with a similar counter and address permutation to that shown in FIG. 7.

Although particular embodiments of the invention and various alternatives have been described in detail, it should be appreciated that numerous modifications, variations, and adaptations may be made without departing from the scope of the invention as defined in the claims.

What is claimed is:

1. A method of producing an extended sequence from a pair of constituent Golay sequences A and B, comprising the steps of: transforming the pair of constituent Golay sequences A and B to form at least one pair of transformed sequences which are also constituent Golay sequences; and concatenating at least two of said pairs of constituent Golay sequences to produce the extended sequence.

2. A method as claimed in claim 1 wherein the step of transforming the pair of constituent Golay sequences A and B to form each pair of transformed sequences comprises a permutation of elements of the sequences.

3. A method as claimed in claim 2 wherein said permutation comprises a reversal of the order of elements in the sequences.

4. A method as claimed in claim 2 wherein said permutation comprises a reversal of a set of address bits identifying locations of elements in the sequences.

5. A method as claimed in claim 2 wherein said permutation comprises a reversal of some but not all of a set of address bits identifying locations of elements in the sequences.

6. A method as claimed in claim 2 wherein said permutation comprises a concatenation of subsets of elements of the sequences selected by decimation.

7. A method as claimed in claim 6 wherein there are two subsets of elements, in even and odd locations in the sequences, that are concatenated.

8. A method of producing a preamble for use on an access channel of a cellular communications system, wherein the preamble includes an extended sequence produced by the method of claim 1.

9. A method as claimed in claim 8 wherein each of the constituent Golay sequences A and B and each of the transformed sequences comprises 256 elements, and the preamble comprises 4096 elements.

10. A method as claimed in claim 9 wherein the extended sequence comprises the constituent Golay sequences A and B and seven different transformations of these sequences A and B.

11. Apparatus for use in carrying out the method of claim 1, comprising a memory for storing elements of each sequence, and address control means for addressing the memory for writing to or reading from the memory consecutively at locations according to the transformed sequences.

12. Apparatus as claimed in claim 11 wherein the address control means comprises a bidirectional counter for supplying memory addresses incremented in either of two opposite directions, and an address permutation unit for permuting said addresses in accordance with the transformed sequences and for supplying the permuted addresses to the memory.

13. A method of providing a preamble for an access channel of a CDMA (code division multiple access) communications system, comprising the steps of: providing a pair of constituent Golay sequences A and B; permuting elements of the pair of sequences A and B to form at least one pair of transformed sequences which are also constituent Golay sequences; and concatenating said at least one pair of transformed sequences with the pair of constituent Golay sequences A and B for use as an extended sequence in the preamble.

14. A method as claimed in claim 13 wherein the preamble is provided by a concatenation of the pair of constituent Golay sequences A and B with a plurality of pairs of said transformed sequences according to different permutations of the elements of the pair of constituent Golay sequences A and B.

15. A method as claimed in claim 13 wherein the step of permuting elements of the pair of sequences A and B comprises a reversal of the order of elements in the sequences.

16. A method as claimed in claim 13 wherein the step of permuting elements of the pair of sequences A and B comprises a reversal of at least some of a set of address bits identifying locations of elements in the sequences.

17. A method as claimed in claim 13 wherein the step of permuting elements of the pair of sequences A and B comprises a concatenation of two subsets of elements of the sequences, the two subsets corresponding respectively to even and odd locations in the sequences.

18. A preamble for an access channel of a CDMA (code division multiple access) communications system, comprising a pair of constituent Golay sequences A and B and, concatenated with the pair of constituent Golay sequences A and B, at least one pair of transformed sequences which are also constituent Golay sequences, each pair of transformed sequences comprising a permutation of elements of the pair of sequences A and B.

19. A preamble as claimed in claim 18 comprising a plurality of pairs of said transformed sequences having different respective permutations of the elements of the pair of sequences A and B.

20. A preamble as claimed in claim 19 wherein a pair of said transformed sequences comprises the pair of sequences A and B with a reversed order of elements in the sequences.

21. A preamble as claimed in claim 19 wherein a pair of said transformed sequences comprises the pair of sequences A and B with elements in the sequences permuted in accordance with a reversed order of at least some of a set of address bits identifying locations of elements in the sequences.

22. A preamble as claimed in claim 19 wherein a pair of said transformed sequences comprises elements in odd locations of the pair of sequences A and B concatenated with elements in even locations in the pair of sequences A and B.

23. A preamble as claimed in claim 18 wherein a pair of said transformed sequences comprises the pair of sequences A and B with a reversed order of elements in the sequences.

24. A preamble as claimed in claim 18 wherein a pair of said transformed sequences comprises the pair of sequences A and B with elements in the sequences permuted in accordance with a reversed order of at least some of a set of address bits identifying locations of elements in the sequences.

25. A preamble as claimed in claim 18 wherein a pair of said transformed sequences comprises elements in odd locations of the pair of sequences A and B concatenated with elements in even locations in the pair of sequences A and B.

* * * * *